US012604788B2

(12) United States Patent
Morford

(10) Patent No.: US 12,604,788 B2
(45) Date of Patent: Apr. 21, 2026

(54) VERIFY IMPLEMENT RECEIVER PHYSICAL MOUNTING LOCATION BY USING THE MACHINE AND IMPLEMENT RECEIVER ACTUAL REPORTED LOCATIONS

(71) Applicant: Deere & Company, Moline, IL (US)

(72) Inventor: Adam J. Morford, Dexter, IA (US)

(73) Assignee: Deere & Company, Moline, IL (US)

( * ) Notice: Subject to any disclaimer, the term of this patent is extended or adjusted under 35 U.S.C. 154(b) by 320 days.

(21) Appl. No.: 18/454,541

(22) Filed: Aug. 23, 2023

(65) Prior Publication Data

US 2025/0063972 A1 Feb. 27, 2025

(51) Int. Cl.
*A01B 59/041* (2006.01)
(52) U.S. Cl.
CPC .................................. *A01B 59/041* (2013.01)
(58) Field of Classification Search
CPC ............................ A01B 59/041; A01B 69/008
USPC .......................................................... 701/50
See application file for complete search history.

(56) References Cited

U.S. PATENT DOCUMENTS 6,434,462 B1 * 8/2002 Bevly ................... G05D 1/0278
                                                              172/3
9,904,290 B2 * 2/2018 Pickett ................. G05D 1/0287

10,524,430 B1 * 1/2020 Nervino ............... A01G 25/167
2008/0147282 A1 * 6/2008 Kormann ............. A01B 69/003
                                                                          701/50
2018/0202804 A1 * 7/2018 Dumble ................. G01B 21/16
2019/0061817 A1 * 2/2019 Mattern ................. B62D 6/002
2021/0144902 A1 * 5/2021 Allgaier ............... A01B 69/003

FOREIGN PATENT DOCUMENTS

EP            0471286 A1 * 2/1992 ......... B62D 53/0871

* cited by examiner

*Primary Examiner* — Jelani A Smith
*Assistant Examiner* — George A Alcorn, III
(74) *Attorney, Agent, or Firm* — Taft Stettinius & Hollister LLP; Stephen F. Rost

(57) ABSTRACT

A work machine includes a frame, a front axle coupled to the frame with front wheels, a rear axle coupled to the frame with rear wheels, and a work vehicle GPS receiver coupled with the frame. An agricultural implement is coupled via a connection mechanism to the frame. An implement GPS receiver mounted on the agricultural implement. A controller is coupled to each of the frame, the work vehicle GPS receiver, and the implement GPS receiver. The controller receives the work vehicle GPS data from the work vehicle GPS receiver and the implement GPS receiver data from the implement GPS receiver. The controller determines an implement profile of the agricultural implement and a shifted implement profile that corresponds to lateral and longitudinal distances of the implement GPS receiver relative to the connection mechanism.

19 Claims, 7 Drawing Sheets

600
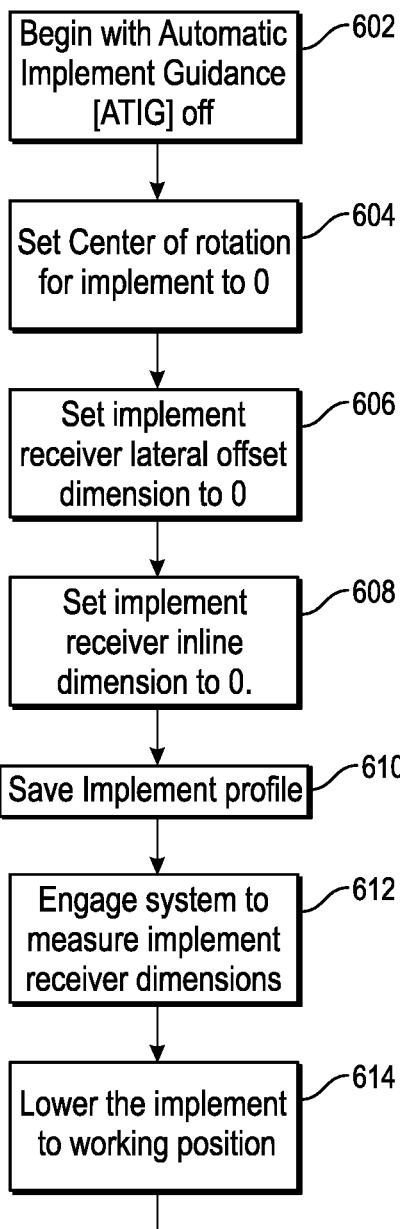
Begin with Automatic Implement Guidance [ATIG] off — 602
Set Center of rotation for implement to 0 — 604
Set implement receiver lateral offset dimension to 0 — 606
Set implement receiver inline dimension to 0. — 608
Save Implement profile — 610
Engage system to measure implement receiver dimensions — 612
Lower the implement to working position — 614
FIG. 4

600

616

Is the implement directly behind the tractor?

YES     NO

618

Has a sufficient length of time passed?

YES     NO

620
Stop the work implement

622
Optionally - Place the work implement in park

624
Toggle or turn ATIG on

626
Determine Implement GPS Lateral Offset

628
Set guidance width to a desired guidance width

630
Turn ATIG off

600

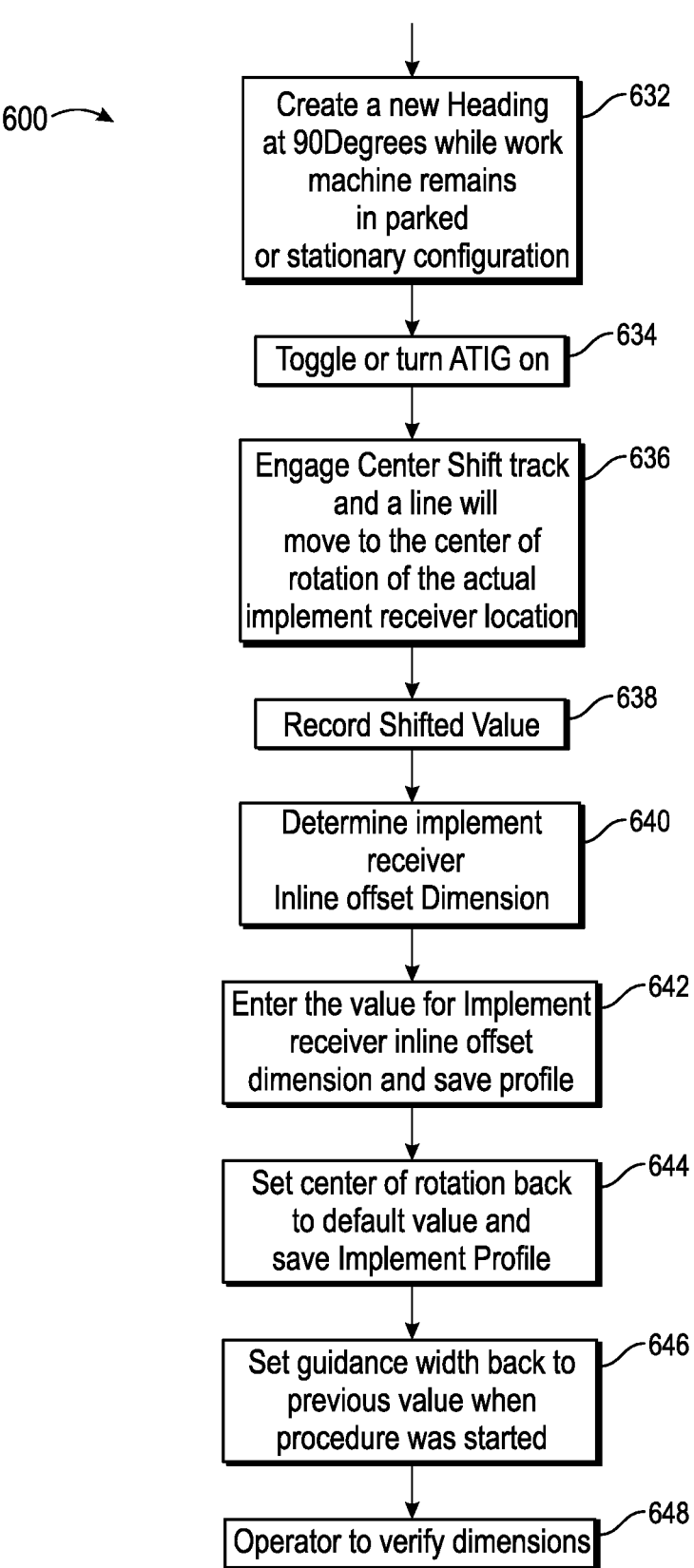

Create a new Heading
at 90Degrees while work
machine remains
in parked
or stationary configuration ⌐632

Toggle or turn ATIG on ⌐634

Engage Center Shift track
and a line will
move to the center of
rotation of the actual
implement receiver location ⌐636

Record Shifted Value ⌐638

Determine implement
receiver
Inline offset Dimension ⌐640

Enter the value for Implement
receiver inline offset
dimension and save profile ⌐642

Set center of rotation back
to default value and
save Implement Profile ⌐644

Set guidance width back to
previous value when
procedure was started ⌐646

Operator to verify dimensions ⌐648

FIG. 6

VERIFY IMPLEMENT RECEIVER PHYSICAL MOUNTING LOCATION BY USING THE MACHINE AND IMPLEMENT RECEIVER ACTUAL REPORTED LOCATIONS

FIELD OF THE DISCLOSURE

The present disclosure relates to verifying an implement receiver mounting location for an implement receiver, and in particular to determining actual receiver locations of the implement receiver and a work machine receiver more accurately and with less chance of error.

BACKGROUND OF THE DISCLOSURE

An accurate measurement of an implement receiver on an implement is critical to the performance of implement guidance and section control. Section control can be used to automatically control the sections on an implement. When section control is enabled, the system utilizes global positioning system (GPS) information to turn implement sections on and off and reduce overlap in previously applied areas of seeds, fertilizer, and other commodities that may be applied to a ground surface of a field. Section control can be used to reference interior and exterior field boundaries of the field.

One technique that can be used to measure an implement receiver location of the implement receiver requires the operator to manually measure the location of the implement receiver physical mount relative to a drawbar pin or other similar attachment location for the implement to the tractor. The position and location of the implement receiver physical mount is hard to measure accurately. When measuring the implement receiver physical mount it is typically done by the operator using a tape measure and a plumb bob. There may be frame components in the way making it more difficult to use the plumb bob to transfer the receiver location to the ground surface and mark the ground surface accurately. The operator measures the mark on the ground surface to the attachment location of the implement to the tractor to determine a longitudinal measurement or offset. The operator also measures lateral left and right offsets of the implement receiver physical mount relative to a centerline of the implement. This process is difficult and time consuming to get highly accurate measurements and may require two people.

A work machine travels from one end of the field to the other and back again to make a pass across a field. Position accuracy of the return pass is critical. Pass-to-pass accuracy ensures the planter row spacing between adjacent rows is accurate and subsequent passes are less likely to result in crop damage. If there is an inline or lateral error in the longitudinal or lateral offsets or measurements then the error that is realized on the ground surface is doubled or compounded as the tractor with implement passes the field in opposite directions to work the entire field.

Thus there is a need for improvement for verifying an implement receiver physical mounting location.

SUMMARY

According to one embodiment of the present disclosure, a work machine comprising: a frame; a front axle coupled to the frame with one or more front wheels that are supported for movement on the front axle; a rear axle coupled to the frame with one or more rear wheels that are supported for movement on the rear axle; a work vehicle GPS receiver coupled with the frame; an agricultural implement coupled to the frame, wherein the agricultural implement includes a connection mechanism configured to attach to the frame of the work machine; an implement GPS receiver mounted on the agricultural implement; a controller coupled to each of the frame, the work vehicle GPS receiver, and the implement GPS receiver, wherein the controller includes memory having instructions stored therein and a processor coupled to the memory, and wherein the instructions are executable by the processor to cause the processor to receive the work vehicle GPS data from the work vehicle GPS receiver, further wherein the instructions are executable by the processor to cause the processor to receive the implement GPS receiver data from the implement GPS receiver, and wherein the instructions are executable by the processor to determine an implement profile of the agricultural implement and a shifted implement profile of the agricultural implement that corresponds to a lateral distance and a longitudinal distance of the implement GPS receiver relative to the connection mechanism.

In one example, wherein the instructions are executable by the processor to engage an automatic implement guidance control device wherein the implement GPS receiver does not track the agricultural implement.

In one example, wherein the implement profile of the agricultural implement includes instructions that are executable by the processor to set an agricultural implement center of rotation for the agricultural implement to 0, set an implement receiver lateral offset to 0, and set an implement receiver inline offset to 0.

In one example, wherein the agricultural implement center of rotation corresponds to an inline distance from the connection mechanism to the center of rotation of the agricultural implement while the agricultural implement is in a working position.

In one example, wherein the connection mechanism includes a drawbar pin.

In one example, wherein the implement receiver lateral offset corresponds to a lateral distance from a vehicle axis of the work machine to a center of the implement GPS receiver.

In one example, wherein the instructions are executable by the processor to determine whether a period of tracking time is greater than a threshold period of tracking time while the work machine drives substantially along a 0 degree track relative to the vehicle axis of the work machine for the period of tracking time, wherein when the period of tracking time is greater than the threshold period of tracking time then the instructions executable by the processor engage the implement GPS receiver to track the agricultural implement as the agricultural implement passes over a ground surface.

In one example, wherein the instructions are executable by the processor to move the agricultural implement to a working position.

In one example, wherein the agricultural implement includes a drawbar, wherein the work machine drives substantially along a 0 degree track relative to the vehicle axis of the work machine for the period of tracking time includes the drawbar aligned with the vehicle axis of the work machine.

In one example, wherein the instructions are executable by the processor to place the work machine in a parked configuration.

In one example, wherein the instructions are executable by the processor to determine a new implement GPS lateral offset when a center shift track button is engaged, and wherein the new implement GPS lateral offset is added to the implement profile to form a new implement profile.

In one example, wherein the instructions are executable by the processor to determine a guidance width for the agricultural implement.

In one example, wherein the instructions are executable by the processor to disengage the automatic implement guidance control device to disengage the implement GPS receiver so that the implement GPS receiver does not track the agricultural implement as the agricultural implement travels over the ground surface.

In one example, wherein the instructions are executable by the processor to execute a new heading at 90 degrees relative to the vehicle axis for the work machine while the work machine is in a parked configuration.

In one example, wherein the instructions are executable by the processor to engage the automatic implement guidance control device to engage the agricultural GPS receiver to track the agricultural implement as the agricultural implement passes over the ground surface, wherein when the center shift track button is engaged the instructions are executable by the processor to determine a shifted value of the agricultural implement.

In one example, wherein the instructions are executable by the processor to determine a shifted implement receiver inline offset of the work vehicle.

In one example, wherein when the work vehicle is an articulated type of vehicle, the instructions are executable by the processor to determine the shifted implement receiver inline offset as the shifted value less a distance from the front axle to an articulation joint of the work vehicle less a distance from the rear axle to the articulation joint less a connection offset plus a work vehicle GPS inline offset.

In one example, wherein when the work vehicle is not an articulated type of vehicle, the instructions are executable by the processor to determine the shifted implement receiver inline offset as the shifted value less a work vehicle GPS inline offset less a connection offset.

In one example, wherein the work vehicle GPS inline offset is the inline distance from the center of the work vehicle GPS receiver to the rear axle of the work vehicle.

In one example, wherein the instructions are executable by the processor to determine a new implement profile that includes the shifted implement receiver inline offset.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 4 is a method of operating the work machine of FIGS. 1 and 2;

FIG. 6 is a continuation of the method of FIGS. 4 and 5 of operating the work machine of FIGS. 1 and 2.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Some benefits of the present disclosure include determining an implement receiver location on an implement more accurately than manual techniques of measurement. Beneficially the present disclosure accounts for orienting the implement receiver on an implement such as a planter relative to a tractor receiver on a tractor or other work machine such that parallel lines are used to measure or determine a lateral offset and a longitudinal offset. As a result the parallel lines measured in the present disclosure determines or measures a 90 degree angle between the implement receiver and the tractor receiver. The present disclosure ensures that a straight line between the implement and tractor receivers is not being measured or determined. This straight line measurement or distance is similar to a hypotenuse of a triangle that is formed between the implement and tractor receivers rather than measuring the two sides of the triangle that is formed between the tractor receiver and the implement receiver wherein the two sides are separated by a 90 degree angle. The two sides of the triangle correspond to the lateral and longitudinal offsets and the present disclosure is directed to determining these measurements.

Figure 1:
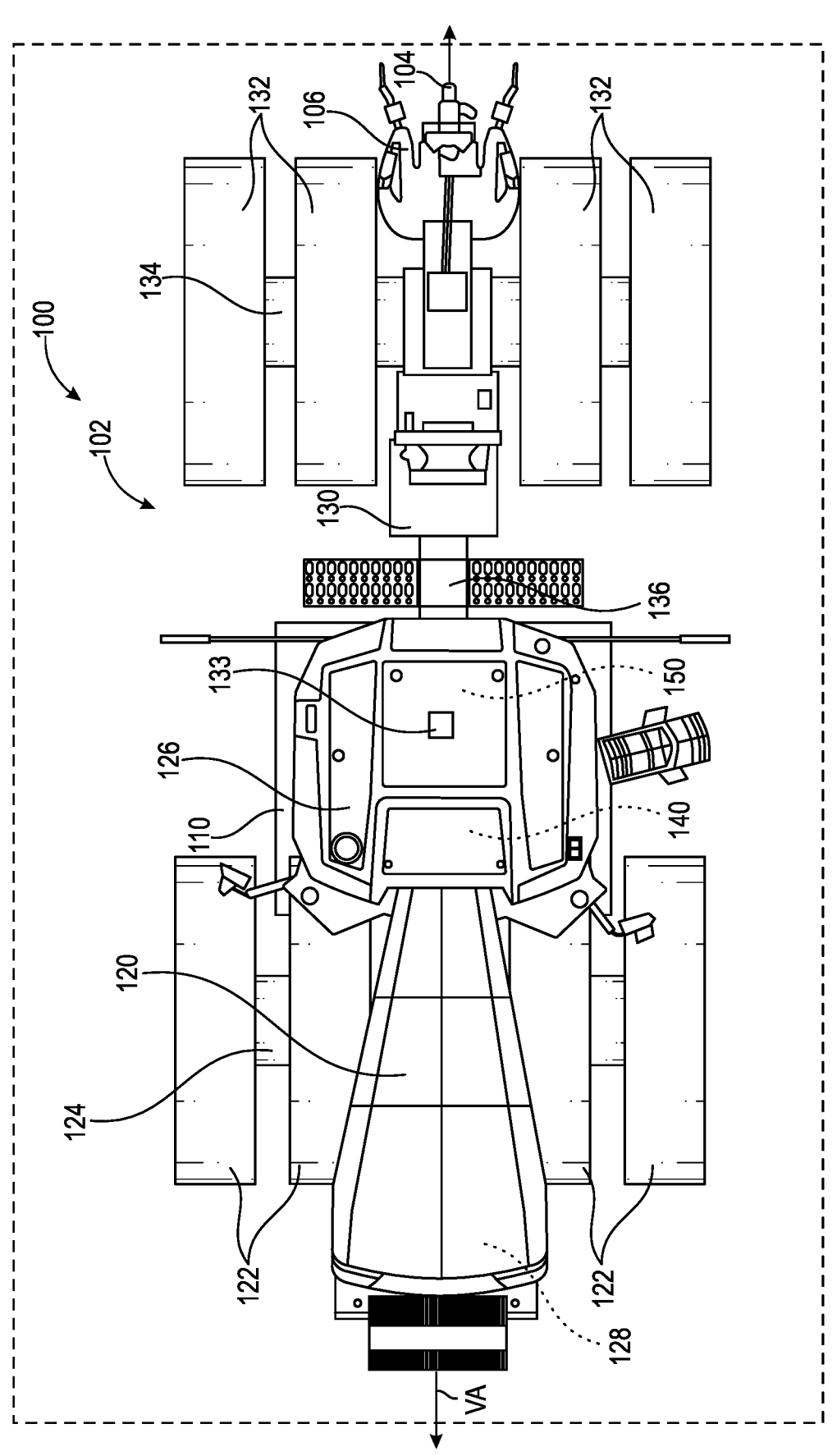
FIG. 1 is a top view of a first embodiment of a work machine.
Figure 2:
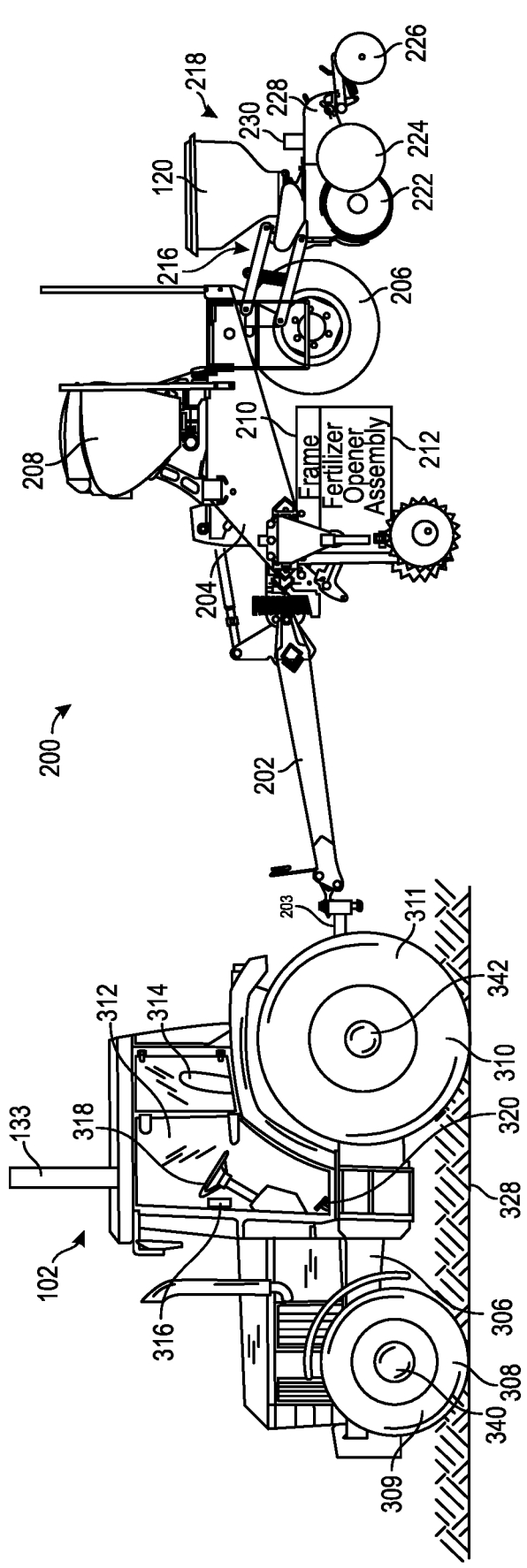
FIG. 2 is a side view of a second embodiment of a work machine with an agricultural implement.

Referring now to the figures wherein like reference numerals correspond to similar elements throughout the several views and, more specifically, referring to FIG. 1, the present application will be described in the context of self-propelled work vehicle 100 travelling along a ground surface 132, such as a dirt field or similar growing medium, wherein the work vehicle 100 is pulling an agricultural implement 200 as illustrated in FIG. 2. The work vehicle 100 is embodied as, or otherwise includes, a tractor 102 that is configured to tow, pull, or otherwise drive movement of, the agricultural implement 200 which may be attached thereto. The tractor 102 includes an implement attachment interface 104 to attach the agricultural implement 200 at a rear end 106 of the tractor 102. It should be appreciated that in some embodiments, the implement attachment interface 104 may be embodied as, or otherwise include, a hitch, a drawbar, or the like. The agricultural implement 200 is an exemplary embodiment of an implement that may be attached to the tractor 102. In other embodiments, the agricultural implement 200 may be configured differently.

In some embodiments, the illustrative tractor 102 may be embodied as, or otherwise include, any one of a number of tractors manufactured by John Deere. In other embodiments, it should be appreciated that the tractor 102 may be embodied as, or otherwise include, any other suitable tractor or agricultural vehicle. Another embodiment of the tractor 102 is illustrated in FIG. 2 and described below.

It should be appreciated that the tractor 102 may be embodied as, or otherwise include, equipment used in one or more of a variety of applications. In the illustrative embodiment, the tractor 102 is adapted for use in one or more agricultural applications as indicated above. In 14 other embodiments, however, the tractor 102 may be embodied as, included in, or otherwise adapted for use with, equipment used in lawn and garden, construction, landscaping and ground care, golf and sports turf, forestry, engine and drivetrain, or government and military 17 applications, for example. In such embodiments, the vehicle 100 of the present disclosure may be included in, or otherwise adapted for use with, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, or marine engines, among other suitable equipment.

The illustrative tractor 102 includes a frame structure 110, a front section 120, and a rear articulation section 130. The frame structure 110 may include, or otherwise be embodied as, a main frame or main chassis of the tractor 102. The front section 120 is coupled to the frame structure 110 and includes front wheels 122 that are supported for movement on a front axle 124. The front section 120 includes an operator cab 126 in which various operational controls for the tractor 102 are provided, as described in greater detail below. The rear articulation section 130 is coupled to the frame structure 110 and to rear wheels 132 that are supported for movement on a rear axle 134. The rear articulation section 130 is pivotally coupled to the front section 120 via an articulation joint 136 and arranged opposite the front section 120 along a centerline or vehicle axis VA. The articulation joint 136 is located at a zero (0) degree inclination, such that the tractor 102 moving in either a forward direction or a rearward direction, moves along a straight line path upon a relatively flat, even, and level surface. Because the rear articulation section 130 is configured for pivotal movement relative to the front section 120 as will be apparent from the discussion that follows, the vehicle 100 may be referred to as an articulated vehicle 100.

In the illustrative embodiment, the front section 120 includes a drive unit or engine 128 that is configured to supply driving power to one or more driven components of the tractor 102. The drive unit 128 is embodied as, or otherwise includes, any device capable of supplying rotational power to driven components of the tractor 102 to drive those components. In some embodiments, rotational power supplied by the drive unit 128 may be provided to the driven components of the tractor 102 by one or more transmission(s). In one example, the drive unit may be configured to supply power to one or more transmission(s) that is/are coupled to the front wheels 122 and/or the rear wheels 132 and operable to provide various predetermined speed ratios selectable by an operator in reverse and forward operating modes. Additionally, in some embodiments, the drive unit 128 may be coupled to a pump or generator to provide hydraulic, pneumatic, or electrical power to one or more components of the tractor 102, as the case may be.

The illustrative tractor 102 includes a front axle steering system 140 associated with the front section 120 and a rear articulation section steering system 150 associated with the rear articulation section 130. The front axle steering system 140 is embodied as, or otherwise includes, a collection of devices that are cooperatively configured to adjust the position and/or angular orientation of the front wheels 122 and the front axle 124 and thereby steer those components during operation of the tractor 102 in response to operating the tractor 102 in an automated steering control mode, which may be provided via a front section steering wheel (not shown) located in the operator cab 126, for example. Alternatively, the front axle steering system 140 is operable in response to a steering input provided by an operator. Similarly, the rear articulation section steering system 150 is embodied as, or otherwise includes, a collection of devices that are cooperatively configured to adjust the position and/or angular orientation of the rear wheels 132 and the rear axle 134 and thereby steer those components during operation of the tractor 102 in response to operating the tractor 102 in an automated steering control mode, which may be provided via a rear articulation section steering wheel (not shown) located in the operator cab 126. Alternatively, the rear articulation section steering system 150 is operable in response to a steering input provided by an operator. It should be appreciated that each of the steering systems 140, 150 may include, or otherwise be embodied as, one or more linkages, racks, pinions, bars, brackets, rods, gears, pulleys, sprockets, wheels, bearings, shafts, chains, belts, axles, actuators, valves, tracks, differentials, or the like which are cooperatively configured to steer the wheels 122, 132 and the corresponding axles 124, 134 based on the automated steering control mode. A GPS antenna/receiver 133 is mounted to the operator cab 126 wherein the GPS antenna/receiver 133 is operably connected with a transceiver 414 and an electronic control unit 405 as described below. The GPS antenna/receiver 133 can be mounted elsewhere on the tractor 102.

Turning now to the second embodiment of the tractor 102 illustrated in FIG. 2, in this system 100, the tractor 102 is shown coupled to and pulling the agricultural implement 200. The tractor 102 may have a chassis 306 that spans between front ground engaging mechanisms or wheels 308 and rear ground engaging mechanisms or wheels 310. In the embodiment of FIG. 2, each ground-engaging mechanism is in the form of a wheel having front tires 309 and rear tires 311 coupled thereto and defined along a respective axle, i.e., a front axle 340 and a rear axle 342. In other embodiments, however, the ground-engaging mechanism may be a track that propels the tractor 102 along an underlying or ground surface 328.

A cab 312 may be coupled to the chassis 306 and define a location for an operator to be positioned in an operator's seat 314. From the cab, the operator may control the tractor 102 and agricultural implement 200 via a plurality of controls. As shown, the cab 312 may include a display 316 or dashboard that visually shows control characteristics of the tractor 102 or agricultural implement 200 such as speed, power, temperature, pressure, direction, tire pressure, ballast position, and any other type of control characteristic. The display 316 may be a touchscreen display that includes one or more operator controls for selectively controlling the operation of the tractor 102 or agricultural implement 200. Other controls may include a steering wheel or yoke 318, a pedal 320 (e.g., a brake pedal, clutch pedal, or throttle pedal), any other type of control such as a joystick, switch, lever, knob, etc. for controlling the tractor 102 and agricultural implement 200. The display 316 can include a user interface to receive input and output 430. A GPS antenna/receiver 133 is mounted to the operator cab 312 wherein the GPS antenna/receiver 133 is operably connected with a transceiver 414 and an electronic control unit 405 as described below. The GPS antenna/receiver 133 can be mounted elsewhere on the tractor 102. An agricultural implement GPS receiver 230 mounted on the agricultural implement 200 is also operably connected with the electronic control unit 405. The agricultural implement GPS receiver 230 can be operably connected with a transceiver (not illustrated) or include a transceiver.

The tractor 102 may be coupled to the agricultural implement 200 through an implement coupler such as a hitch member or drawbar 202 and a drawbar pin 203 for connecting to the tractor 102 at the implement attachment interface 104. The hitch member or drawbar 202 may be sufficiently strong to transfer motion of the tractor 102 to the agricultural implement 200. In one embodiment, when the tractor 102 travels in a forward direction, the hitch member or drawbar 202 pulls the agricultural implement 200 along therewith in approximately the same direction. While the implement coupler is described herein as being a hitch member or drawbar 202, other embodiments consider an implement coupler that utilizes a three-point hitch assembly as is known in the art. Accordingly, this disclosure considers many different types of implement couplers.

The agricultural implement 200 includes a planter having a plurality of planting units 218 attached to a main frame 204. As shown in FIG. 2, a planting unit 218 is attached to the main frame 204 via a parallel linkage 216. The parallel linkage 216 may allow for independent vertical movement of the planting unit 218 relative to the chassis 204 as it traverses along uneven ground in use of the planter 200, among other things.

Each planting unit 218 may include its own support structure 228 to which a seed hopper is coupled, at least in some embodiments. The seed hopper 220 may store seed to be planted by the planting unit 218 during a planting operation. Seed may be deposited within a trench or furrow formed by a trench-forming disk 222. The depth at which the trench-forming disk 222 is positioned relative to the soil may be set by a gauge wheel 224 and a depth-setting mechanism (not shown). A pair of closing wheels 226 may be coupled to the support structure 228 of the planting unit 218 in order to close or cover the trench with soil. An implement GPS receiver 230 is mounted to the support structure 228 of the planting unit 218 in the illustrated embodiment. In other embodiments, the GPS receiver 230 can be mounted on other areas of the planting unit 218. The GPS receiver 230 is in operative communication with an electronic control unit 405 on the tractor 102.

In the illustrative embodiment, a frame 210 is coupled to, and capable of movement relative to, the chassis 204. In some embodiments, the frame 210 may be embodied as, or otherwise include, a toolbar or drawbar. In one embodiment, at least one fertilizer opener 6 assembly 212 is coupled to the frame 210 to selectively form trenches in the soil for the deposition of fertilizer. A hopper or tank 208 may be used to store fertilizer (e.g., dry granular fertilizer or gaseous or liquid fertilizer) for deposition in the trenches formed by the fertilizer opener assembly 212. Each fertilizer opener assembly 212 includes a cutting disk (not illustrated) and a gauge wheel (not illustrated), among other things. The cutting disk may be set and/or positioned at a defined depth into the soil to form a furrow or trench therein. The gauge wheel may be used to set the depth of the furrow or trench to be formed by the cutting disk.

Figure 3:
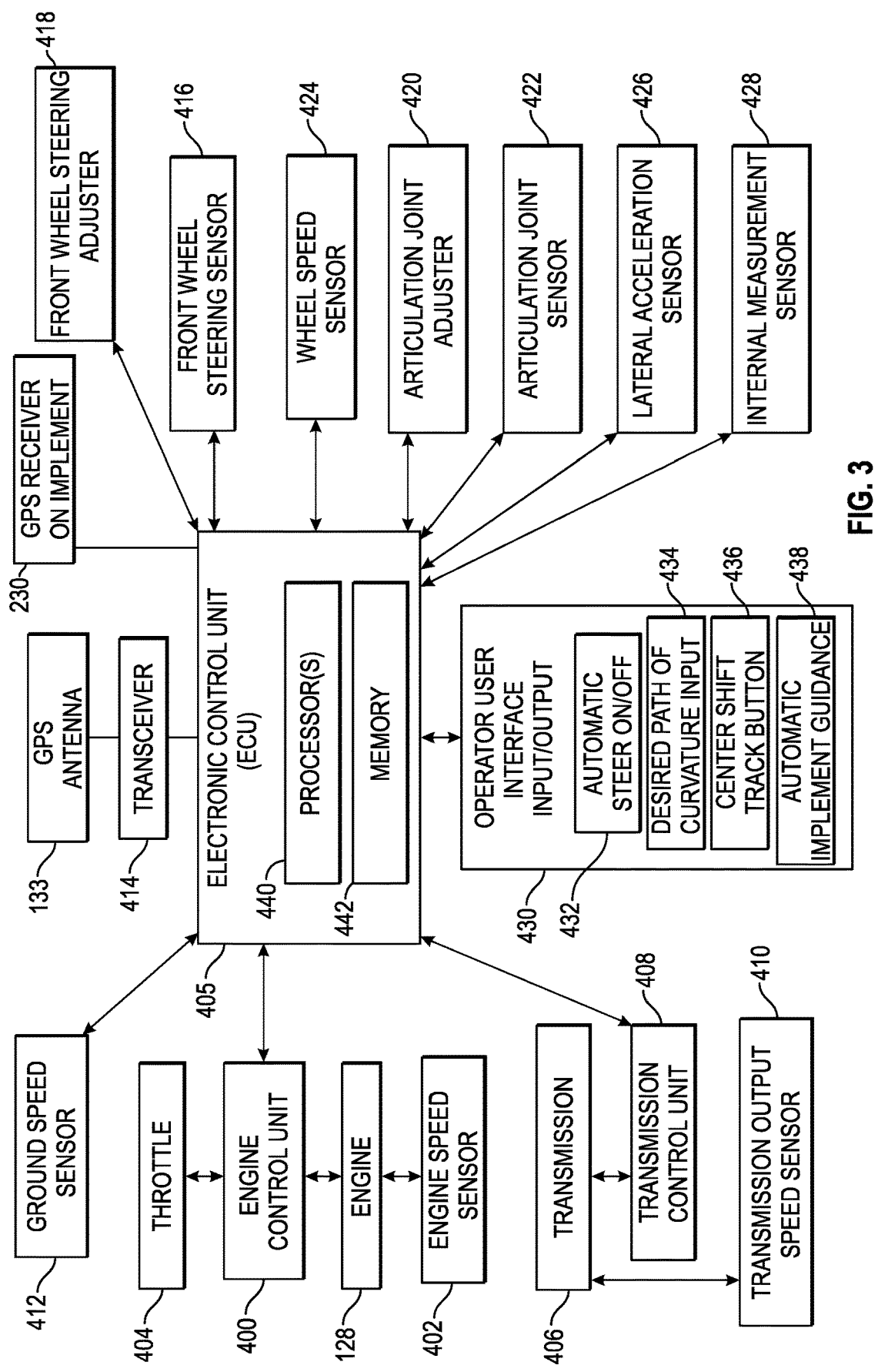
FIG. 3 is a schematic representation of an electronic control unit for the work machine of FIGS. 1 and 2.

As further illustrated in FIG. 3, the tractor 102 includes the engine 128 which is operatively connected to an engine control unit 400, which in one embodiment is operatively connected to an engine speed sensor 402 configured to determine the speed of the engine 128. A throttle 404 is operatively connected to the engine control unit 400 to adjust the speed of the engine, and therefore the vehicle speed as would be understood by one skilled in the art. In another embodiment, the throttle 404 is additionally a machine controlled throttle which is automatically controlled by an electronic control unit (ECU) 405, also known as a controller, in response to vehicle speed information. The engine control unit 400 is operatively connected to the ECU 405, which is located in the cab 126, 312 or at other locations within the tractor 102. The ECU 405 is configured to receive and to process vehicle information received from the engine control unit 400.

A transmission 406 is operatively connected to the front wheels 122, 308 and to the rear wheels 132, 310 to move the vehicle in a forward or a reverse direction. A transmission control unit 408 is operatively connected to the ECU 405. A transmission output speed sensor 410 is operatively connected to the transmission 406 and is configured to determine the output speed of the transmission 406. The output speed of the transmission 406 determines the rotational speed of the wheels, and therefore the speed of the tractor 102.

In addition to the engine speed sensor 402 and the transmission output speed sensor 410, other vehicle environment sensors are operatively connected to the ECU 405 to monitor the operating conditions of the vehicle. A ground speed sensor 412 is operatively connected to the ECU 405 to provide the ground speed of the tractor 102 as it moves in the forward or in a reverse direction. In one embodiment, the ground speed sensor 412 is a radar unit connected to the vehicle and is configured to provide a radar signal to the ECU 405 for determining speed. In another embodiment, a ground speed signal is provided by the GPS antenna/receiver 133 through a receiver or transceiver 414 configured to communicate with a global positioning system as is understood by those skilled in the art.

Additional vehicle environment sensors are used by the vehicle or tractor 102 to control the forward and the rearward movement of the vehicle either in a straight line path or in a curved line path, such as when the vehicle is turning at the end of rows in a field. A front wheel steering sensor 416 is operatively connected to the ECU 405 and is configured to transmit a front axle steering angle of the front wheels. The front wheel steering sensor 416, in one embodiment, is located at a steering gearbox of the front axle steering system 140. Other locations of the front wheel steering sensor 416 are contemplated including at a front wheel steering adjuster 418 configured to move the front wheels 122 in the desired direction. In one embodiment, the front wheel steering adjuster 418 is a steering wheel. In another embodiment, the front wheel steering adjuster 418 is included as a feature of the ECU 405 which automatically adjusts the direction of the front wheels 122 as describe herein. In still another embodiment, the front wheel steering adjuster 418 commands the direction of the front wheels in response to signals received from the global positioning system.

The vehicle or tractor 102 further includes an articulation joint adjuster 420, or articulator, which is configured to adjust the position of the rear articulation section 130 with respect to the front section 120 in response to one or more of the steering wheel, the front wheel adjuster 418, and signals received from the electronic control unit 405 generated in response to directional signals. An articulation joint sensor 422 is located at one or more locations on the vehicle or tractor 102. In one embodiment, the articulation joint sensor 422 is located at the articulation joint 136 and is configured to determine an amount of pivot or an articulation steering angle at the articulation joint 136. In one embodiment, the articulation joint sensor 422 determines a mechanical position between a fixed part of one of the frames and a corresponding movable part that pivots about the fixed part. In another embodiment, the articulation joint sensor 422 is configured as a portion of the ECU 405 and determines the position of the rear articulation section 130 with respect to the front section 120 based on the signal being transmitted to the articulation joint adjuster 420. In one embodiment, the articulator joint adjustor 420 includes a first and a second hydraulic cylinder each of which is coupled the front section 120 and the rear articulation section 130 at the articulation joint 136. Actuation control of each of the first and second cylinders by the controller 405 adjusts the position of the rear articulation section 130 with respect to the front section 120. Other types of articulators 420 are contemplated.

Additional vehicle environment sensors include, but are not limited to, a wheel speed sensor 424, a lateral acceleration sensor 426, and an inertial measurement sensor 428. The wheel speed sensor 424, in different embodiments, is located at one or more of the wheels 122, 308 and 132, 310 and determines a speed of the wheel with respect to a fixed part of the vehicle or tractor 102, such as the supporting axle 124, 340 or 134, 342. The wheel speed sensor 424 is configured to transmit a wheel speed signal to the ECU 405 that includes rotational speed information of the wheel when the wheels are providing traction or when the wheels are slipping or spinning. The ECU 405 is configured to determine when the wheels are losing traction, slipping, or spinning, by comparing the wheel speed to the ground speed signal generated by the ground speed sensor 412.

The lateral acceleration sensor 426 is operatively connected to the vehicle in one or more locations either at the front section 120 or the rear articulation section 130. The lateral acceleration sensor 426, in one or more embodiments, includes a lateral accelerometer device or a sensor that measures yaw rate. In one embodiment the wheel speed sensor 424 includes two or more lateral acceleration sensors, where at least one of the sensors 424 is located at the front section 120 and another one of the sensors is located at the rear articulation section 130. The inertial measurement sensor 428, in different embodiments, determines lateral acceleration of the vehicle or tractor 102, either alone or in combination with the lateral acceleration sensor 426. In different embodiments, the inertial measurement sensor 428 includes, an accelerometer, a gyroscope, a magnetometer, or a combination thereof.

The vehicle or tractor 102 further includes the operator user interface 430 that is operatively connected to the ECU 405. The user interface 430 includes various user input and/or outputs for determining and/or displaying vehicle status. The user interface 430 further includes one or more control mode inputs configured to automatically control steering of the tractor 102 and implement tracking or guidance of the agricultural implement 200. An automatic steering on and off control device 432 is configured to enable a user to set the vehicle in an automatic or automated steering mode or in a manual steering mode in which the operator controls steering of the vehicle. When the automatic steering is turned on, a desired path curvature of the tractor 102 is determined by the ECU 405 based on information stored in the memory 442, or based on information received through the GPS antenna/receiver 133, or the front wheel sensor 416 and the articulation joint sensor 422. In another embodiment, the user interface 430 includes a desired path of curvature input 434 which enables the user to select a desired path of curvature of the tractor 102 and determine a desired steering angle. An automatic implement guidance on and off control device 438 is configured so that the GPS receiver 230 can track the agricultural implement 200 as the agricultural implement 200 passes over the ground surface 328.

The ECU 405, in different embodiments, includes a computer, computer system, or other programmable devices. In other embodiments, the ECU 405 can include one or more processors (e.g. microprocessors), and an associated memory 442, which can be internal to the processor or external to the processor 440. The memory 442 can include random access memory (RAM) devices comprising the memory storage of the ECU 405, as well as any other types of memory, e.g., cache memories, non-volatile or backup memories, programmable memories, flash memories, and read-only memories. In addition, the memory in different embodiments includes a memory storage physically located elsewhere from the processing devices, including any cache memory in a processing device, as well as any storage capacity used as a virtual memory, e.g., as stored on a mass storage device or another computer coupled to ECU 405. The mass storage device can include a cache or other dataspace which can include databases. Memory storage, in other embodiments, is located in the "cloud", where the memory is located at a distant location which provides the stored information wirelessly to the ECU 405. When referring to the ECU 405 and the memory 442 in this disclosure other types of controllers and other types of memory are contemplated.

The ECU 405 executes or otherwise relies upon computer software applications, components, programs, objects, modules, or data structures, etc. Software routines resident in the included memory of the ECU 405, or other memory, are executed in response to the signals received from the sensors as well as signals received from the engine control unit 405, the transmission control unit 408, the ground speed sensor 412, the GPS antenna/receiver 133, and the GPS receiver 230. The ECU 405 also relies on computer software applications to adjust the front wheel steering operation as well as adjust the articulation joint steering operation. The computer software applications, in other embodiments, are located in the cloud. The executed software includes one or more specific applications, components, programs, objects, modules or sequences of instructions typically referred to as "program code". The program code includes one or more instructions located in memory and other storage devices which execute the instructions which are resident in memory, which are responsive to other instructions generated by the system, or which are provided a user interface operated by the user.

Figure 5:
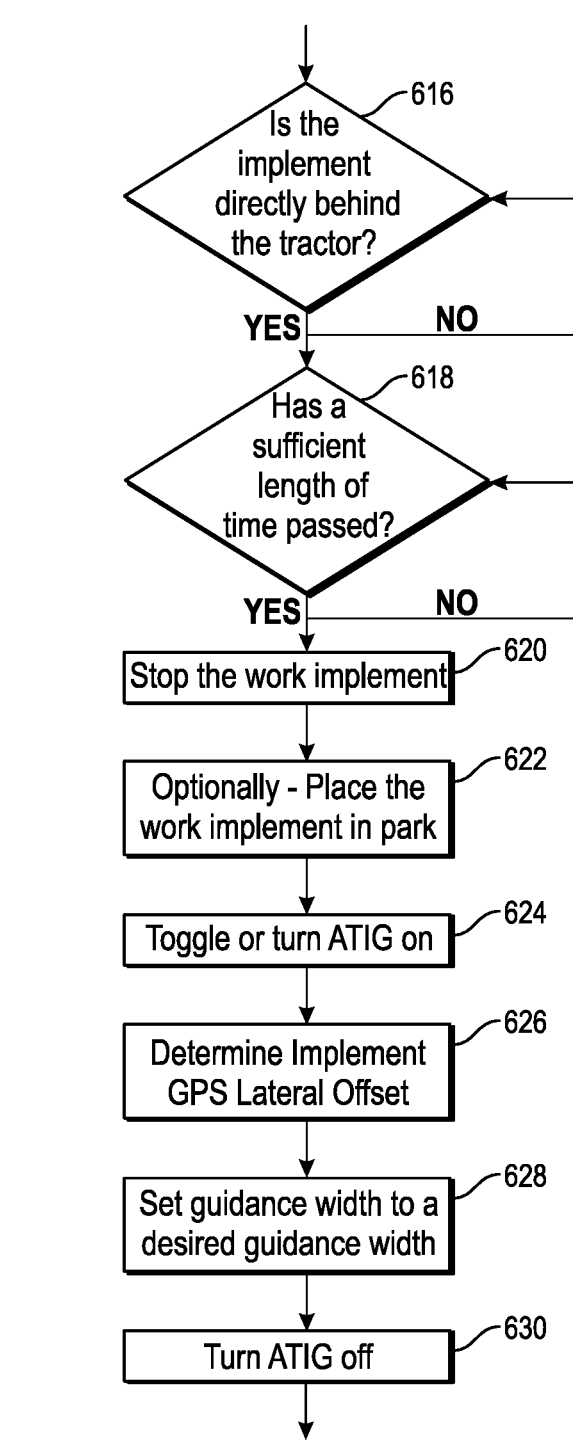
FIG. 5 is a continuation of the method of FIG. 4 of operating the work machine of FIGS. 1 and 2.

Referring now to FIGS. 4, 5, and 6, an illustrative method 600 of operating the work machine 100 may be embodied as, or otherwise include, a set of instructions that are executable by the ECU 405. The method 600 corresponds to, or is otherwise associated with, performance of the blocks described below in the illustrative sequence of FIGS. 4, 5, and 6. It should be appreciated, however, that the method 600 may be performed in one or more sequences different from the illustrative sequence. Additionally, it should be appreciated that one or more blocks of the illustrative method 600 may be performed in parallel with, or contemporaneously with, one another.

The method 600 generally corresponds to utilizing actual receiver locations of the GPS antenna/receiver 133 on the tractor 100 and the GPS receiver 230 on the agricultural implement and guidance lines on the user interface 430 to determine a mounting location of the GPS receiver 230 on the agricultural implement 200. The method 600 changes where the guidance line is when an operator presses a center shift track button 436 on the user interface input 430. The method 600 includes determining an actual location of each of the GPS receivers 133 and 230 by setting a measurement for the implement GPS receiver 230 to 0 inches left, 0 inches right, and 0 inches inline offset. The method 600 includes setting an implement center of rotation to 0 feet. The tractor 102 then drives forward in a straight position relative to a straight line on the user interface 430 and ensures the agricultural implement 200 is tracking directly behind the tractor 102. Once the agricultural implement 200 is directly behind the tractor 102, the tractor 102 is stopped and the tractor 102 is placed in parked configuration.

After the tractor 102 comes to a stop, then ATIG is turned on or engaged when the center shift track button 436 is engaged. This moves the guidance line on the user display 430 to the position of the implement GPS receiver 230 and then the shifted line amount will be displayed on the user display 430. The shifted line amount is entered into an implement profile for a lateral offset in the ECU 405. Next ATIG is turned off and a new line is created that is 90 degrees offset from the previous line and displayed on the user interface 430. ATIG is turned back on and center shift track button 436 is pressed again to move the line to the implement location in the ECU 405. This value of how far the line was shifted is the actual physical distance from the tractor GPS antenna/receiver 133 to the GPS receiver 230. The implement offsets and mounting offsets are subtracted from known measurements for the tractor 102 to arrive at the inline offset of the implement GPS receiver 230.

The user display 430 has a button for an operator to press that will measure the implement receiver dimensions automatically by the ECU 405. Alternatively, in other embodiments, the ECU 405 measures the implement receiver dimensions automatically without input by the operator. The agricultural implement 200 is lowered to a working position and as the tractor 102 drives or moves along a line the agricultural implement 200 tracks on the line until the agricultural implement 200 is directly behind the tractor 102. Once the method 600 determines that the agricultural implement 200 is directly behind the tractor 102 for a sufficient length of time, the ECU 405 issues a message on the user interface 430 that instructs the operator to come to a stop and place the tractor 102 in park. Once the tractor 102 is in park the method 600 will execute these steps.

The illustrative method 600 begins with block 602. In block 602, the operator engages the automatic implement guidance on and off control device 438 so that the GPS receiver 230 does not track the agricultural implement 200. Alternatively, in other embodiments, the ECU 405 engages the automatic implement guidance on and off control device 438.

Figure 7:
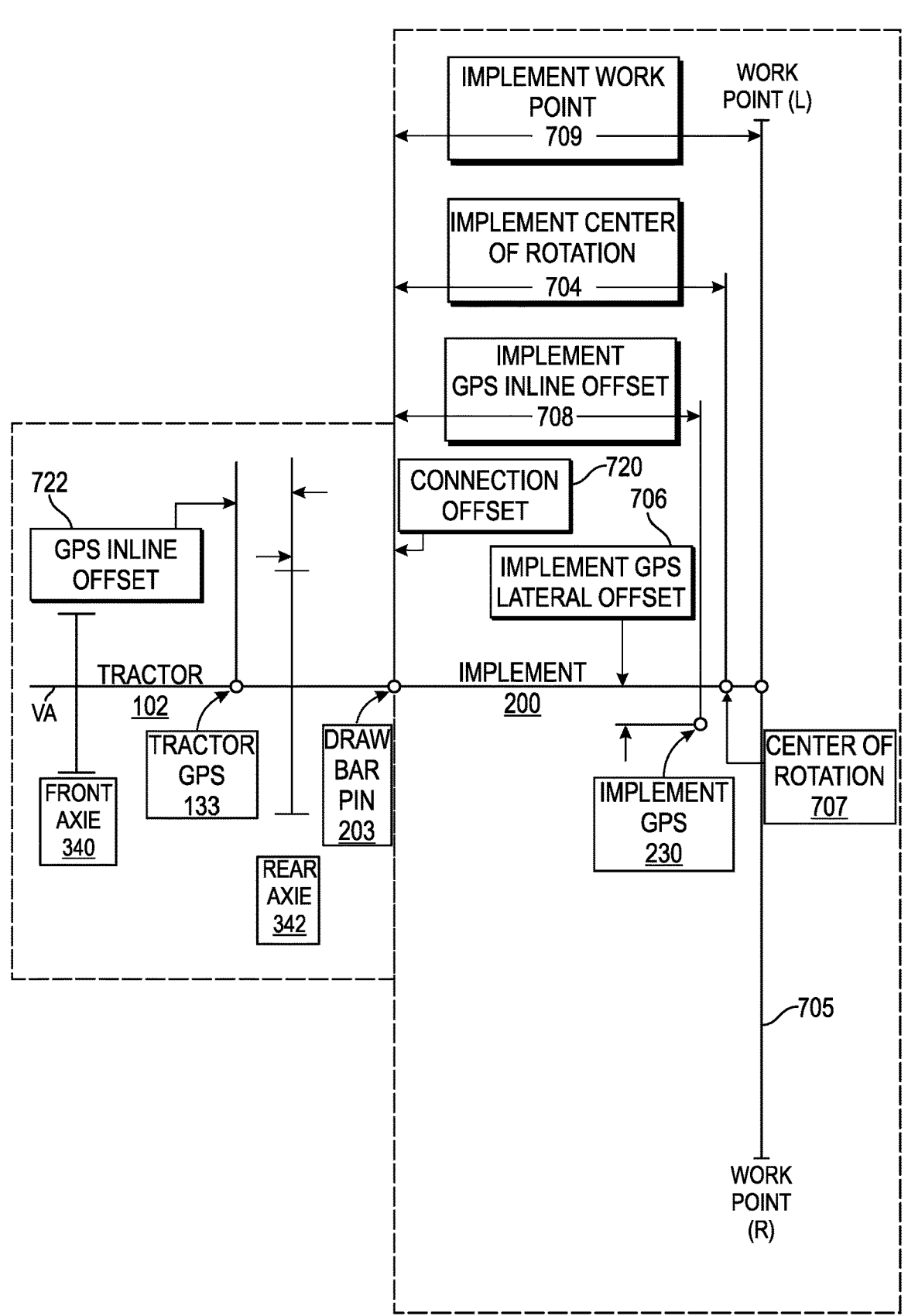
FIG. 7 is a schematic representation of the work machine and the agricultural implement of FIGS. 1 and 2.

In step 604, the operator or the ECU 405 sets a center of rotation 704 for the agricultural implement 200 to 0 feet or inches. In other embodiments, the center of rotation 704 may be set in metric units. Illustrated in FIG. 7 is a schematic representation of the tractor 102 and the agricultural implement 200 and certain measurements that are performed with the method 600 to the tractor GPS receiver 133, the GPS receiver 230, and the drawbar pin 203 are illustrated. In FIG. 7, an agricultural implement center of rotation 704 is the inline distance from the connection point or the drawbar pin 203 to a center of rotation 707 of the agricultural implement 200 while the agricultural implement 200 is in a working position. The working position corresponds to the location where load-bearing parts of the agricultural implement 200 contact the ground surface 328. The connection point is the location where the agricultural implement 200 connects to the tractor 102 and in the illustrated embodiment the connection point is the drawbar pin 203 on the agricultural implement 200.

In step 606, the operator or the ECU 405 sets an implement receiver lateral offset 706 to 0 feet or inches. In other embodiments, the implement receiver lateral offset 706 may be set in metric units. In FIG. 7, the implement receiver lateral offset 706 (left or right) is the lateral distance from the centerline or the vehicle axis VA of the tractor 102 to the center of the GPS receiver 230. In some embodiments, the GPS receiver 230 is offset left or right of the center line VA of the tractor 102.

In step 608, the operator or the ECU 405 sets an implement receiver inline offset 708 to 0 inches or feet. In other embodiments, the implement receiver inline offset 708 may be set in metric units. In FIG. 7, the implement receiver inline offset 708 is the inline distance from the center of the GPS receiver 230 to the connection point or the drawbar pin 203 on the agricultural implement 200.

In step 610, the operator or the ECU 405 saves the center of rotation 704, implement receiver lateral offset 706, and implement receiver inline offset 708 as an implement profile of the agricultural implement 200 in the ECU 405.

In step 612, the operator or the ECU 405 engages the tractor 102 to drive the tractor 102 in a forward direction relative to the agricultural implement 200. In other embodiments, the tractor 102 can be driven autonomously by the ECU 405.

In step 614, the operator or the ECU 405 lowers agricultural implement 200 into a working position as previously described. In other embodiments, the agricultural implement 200 can be moved autonomously by the ECU 405.

In step 616, the operator or the ECU 405 continues to drive the tractor 102 such that the tractor 102 tracks on an A+ heading or 0 degree track relative to the vehicle axis VA or centerline through the tractor 102 such that the drawbar 202 is directly in line with the vehicle axis VA of the tractor 102. If the drawbar 202 is not directly in line with the vehicle axis VA of the tractor 102, then the operator may receive a notification on the output 430.

In step 618, while the tractor 102 is tracking and driving along the 0 degree track, the operator or the ECU 405 determines if a period of tracking time is greater than a threshold period of tracking time. If yes, then a sufficient amount of time has passed to ensure that the agricultural implement 200 is perpendicular to the tractor 102. If not, then the tractor 102 with the agricultural implement 200 continues tracking and driving along the 0 degree track. In other embodiments, the tractor 102 can be driven autonomously by the ECU 405.

In step 620, the tractor 102 is placed in a parked configuration by the operator or the ECU 405 so that the agricultural implement 200 stops forward travel or movement. In step 622, optionally the agricultural implement 200 is also placed in a parked configuration.

In step 624, the operator or the ECU 405 engages the automatic implement guidance on and off control device 438 to engage the GPS receiver 230 to track the agricultural implement as the agricultural implement 200 passes over the ground surface 328.

In step 626, the ECU 405 or operator engages the center shift track button 436. The ECU 405 measures or determines a new implement GPS lateral offset 706. The new implement GPS lateral offset 706 is added to an implement profile and saved.

In step 628, an operator or the ECU 405 selects or determines a guidance width 705 which is a width of the area tilled, planted, sprayed, or harvested on each pass through the field or over the ground surface 328 by the agricultural implement 200. The guidance width 705 is the distance between a work point (R) and a work point (L) on the ground surface 328. The implement work point 709 is the distance from drawbar pin 203 to a line through the work points (R, L) of the agricultural implement 200 and the centerline or vehicle axis VA of the tractor 102.

In step 630, the operator or the ECU 405 disengages the automatic implement guidance on and off control device 438 to disengage the GPS receiver 230 so that the GPS receiver 230 does not track the agricultural implement 200 as the agricultural implement 200 passes over the ground surface 328.

In step 632, a new heading at 90 degrees for the tractor 102 is entered by an operator in the ECU 405 while the tractor 102 is in a parked configuration so that the agricultural implement 200 stops forward travel or movement. The ECU 405 positions a point directly through the tractor GPS receiver 133 for tracking the tractor 102 as it moves or drives forward.

In step 634, the operator or the ECU 405 engages the automatic implement guidance on and off control device 438 to engage the GPS receiver 230 to track the agricultural implement as the agricultural implement 200 passes over the ground surface 328.

In step 636, the operator or the ECU 405 engages the center shift track button 436 and a line will move to the center of rotation 707 of an actual implement receiver location of the GPS receiver 230. The line is the guidance line shown on the map. The line represents where the agricultural implement 200 or the tractor 102 would track to.

In step 638, the ECU 405 determines a shifted value in inches or feet which corresponds to the amount the line moved in step 636. In other embodiments, the shifted value may be set in metric units. The line is moved from the original location it was created through the GPS 6 receiver 133 to the agricultural implement GPS receiver 230. The parallel distance is calculated by the ECU 405 and represented as a shifted value.

In step 640, the ECU 405 determines a shifted implement receiver inline offset in inches or feet. In other embodiments, the shifted implement receiver inline offset may be determined in metric units. The shifted implement receiver inline offset will depend if the tractor 102 is an articulated type of vehicle. The ECU 405 determines if the tractor 102 is an articulated type of vehicle, and if it is not articulated then the shifted implement receiver inline offset is determined by the shifted value from step 638 minus or less a tractor GPS inline offset 722 minus or less a connection offset 720. The tractor GPS inline offset 722 is the inline distance from the center of the GPS receiver 133 to a point on the tractor 102. In the illustrated embodiment, the point on the tractor 102 is the rear axle 342. The connection offset 720 is dependent on the type of agricultural implement 200 that is attached to the tractor 102. The connection point is the location where the agricultural implement 200 connects to the tractor 102 and in the illustrated embodiment the connection point is the drawbar pin 203 on the agricultural implement 200. The connection offset 720 is the measurement of the distance between the drawbar pin 203 and a point on the tractor 102 and in the illustrated embodiment the point on the tractor 102 is the rear axle 342. Therefore the connection offset 720 is the measurement of the distance between the drawbar pin 203 and the rear axle 342. In other embodiments, the point on the tractor 102 may be something other than the rear axle 342. If the ECU 405 determines the tractor 102 is an articulated type of vehicle then the pivot dimensions need to be accounted for. The ECU 405 determines the implement receiver inline offset is the shifted value from step 638 minus or less the distance from the front axle 124 to the pivot or articulation joint 136 minus or less the rear axle 134 to the articulation joint 136 minus or less the connection offset 720 plus or additionally the tractor GPS inline offset 722.

In step 642, the ECU 405 or the operator enters or saves the value for the implement receiver inline offset as determined from step 640 in the ECU 405 which can be saved as an implement profile.

In step 644, the ECU 405 or the operator sets the center of rotation 707 to a default value and updates the implement profile. In one embodiment, the default value includes an original value that existed prior to any changes or earlier steps mentioned above.

In step 646, the ECU 405 or the operator sets the guidance width 705 back to the previous value prior to step 632. The guidance width 705 is set to a larger or wider value because in previous steps, the ECU 405 used track 0 as the track we were moving.

In some embodiments, in step 648 the operator verifies the dimensions including the implement receiver inline offset 708, the center of rotation 707, the guidance width 705. The ECU 405 displays the dimensions on the user interface 430 for the operator. In other embodiments, the operator does not verify the dimensions.

In other embodiments, there are alternative techniques to accurately measure the mounting location of the GPS receiver 230 of the agricultural implement 200. In one embodiment, the operator defines a boundary location in the field that a dynamic calibration occurs. Once the boundary location is defined then a pre-defined course will be placed inside the boundary location and the operator is instructed by the ECU 405 to begin at a certain position. As part of this course the tractor 102 and the agricultural implement 200 will drive back and forth on the same straight line. The tractor 102 stops in one direction and the GPS receiver 230 is measured. The ECU 405 instructs the operator by displaying a message on the user interface 430 to place a marker, flag, or other identifier at both of the work points (L) and (R) on a straight part of the line the tractor 102 will then continue to turn around and return on the same line and the operator will be again instructed to place another 2 flags and measure the distance between them to verify that the work point is correctly defined and displayed in the display 316.

An alternative embodiment includes the agricultural implement 200 being a planter wherein the planter places one or more seeds or other commodities on the ground surface 328 at the work points (L, R) eliminating the need for the operator to exit the cab 312 to place the flags or other identifiers. Once the work points (L, R) are verified and the GPS receiver 230 is measured, the tractor 102 continues to drive in circles and known curvatures and the implement receiver location for the GPS receiver 230 is used to determine the center of rotation 707 with the agricultural implement 200 in the ground as well as raised up out of the ground 328. In some embodiments, the ECU 405 determines an autosteer calibration id incorporated into this procedure to tune the entire systems steering performance. In one form, this enables hydraulic 2 steering valves to be fine-tuned to understand the response a given steering command makes on the tractor 102.

An alternate embodiment includes determining locations of one or more of the implement GPS receivers 230 and determining a raw location of two of the GPS receivers 230. After the raw locations of two of the GPS receivers 230 are determined then the ECU 405 determines the difference in position between them. The ECU 405 instructs the operator to accurately position the agricultural implement 200 directly inline or along the centerline or vehicle axis VA of the tractor 102 for accurate tractor measurements in the condition that the GPS receivers 230 are mounted centered on the agricultural implement 200 relative to the center of rotation 707. If the GPS receivers 230 are offset relative to the center of rotation 707 then a GPS lateral offset 706 is measured. By measuring and accurately positioning the GPS receivers 230 relative to the vehicle axis VA and the center of rotation 707, then the ECU 405 does not measure the right angle dimension of the triangle formed between the two GPS receivers 230.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

The invention claimed is:

1. A work machine comprising:
   a frame;
   a front axle coupled to the frame with one or more front wheels that are supported for movement on the front axle;
   a rear axle coupled to the frame with one or more rear wheels that are supported for movement on the rear axle;
   a work vehicle GPS receiver coupled with the frame;
   an agricultural implement coupled to the frame, wherein the agricultural implement includes a connection mechanism configured to attach to the frame of the work machine;
   an implement GPS receiver mounted on the agricultural implement;
   a controller coupled to each of the frame, the work vehicle GPS receiver, and the implement GPS receiver, wherein the controller includes memory having instructions stored therein and a processor coupled to the memory, and wherein the instructions are executable by the processor to cause the processor to receive the work vehicle GPS data from the work vehicle GPS receiver, further wherein the instructions are executable by the processor to cause the processor to receive the implement GPS receiver data from the implement GPS receiver, and wherein the instructions are executable by the processor to determine an implement profile of the agricultural implement and a shifted implement profile of the agricultural implement that corresponds to a lateral distance and a longitudinal distance of the implement GPS receiver relative to the connection mechanism, wherein the determination of the shifted implement profile includes wherein the instructions are executable by the processor to disengage an automatic implement guidance control device to disengage the implement GPS receiver so that the implement GPS receiver does not track the agricultural implement as the agricultural implement travels over the ground surface.

2. The work machine of claim 1, wherein the instructions are executable by the processor to engage the automatic implement guidance control device wherein the implement GPS receiver does not track the agricultural implement.

3. The work machine of claim 2, wherein the implement profile of the agricultural implement includes instructions that are executable by the processor to set an agricultural implement center of rotation for the agricultural implement to 0, set an implement receiver lateral offset to 0, and set an implement receiver inline offset to 0.

4. The work machine of claim 3, wherein the agricultural implement center of rotation corresponds to an inline distance from the connection mechanism to the center of rotation of the agricultural implement while the agricultural implement is in a working position.

5. The work machine of claim 3, wherein the connection mechanism includes a drawbar pin.

6. The work machine of claim 3, wherein the implement receiver lateral offset corresponds to a lateral distance from the vehicle axis of the work machine to a center of the implement GPS receiver.

7. The work machine of claim 1, wherein the instructions are executable by the processor to determine whether a period of tracking time is greater than a threshold period of tracking time while the work machine drives along a 0 degree track relative to the vehicle axis of the work machine for the period of tracking time, wherein when the period of tracking time is greater than the threshold period of tracking time then the instructions executable by the processor engage the implement GPS receiver to track the agricultural implement as the agricultural implement passes over a ground surface.

8. The work machine of claim 7, wherein the instructions are executable by the processor to move the agricultural implement to a working position.

9. The work machine of claim 8, wherein the agricultural implement includes a drawbar, wherein the work machine drives along a 0 degree track relative to the vehicle axis of the work machine for the period of tracking time while the drawbar is aligned with the vehicle axis of the work machine.

10. The work machine of claim 9, wherein the instructions are executable by the processor to place the work machine in a parked configuration.

11. The work machine of claim 10, wherein the instructions are executable by the processor to determine a new implement GPS lateral offset when the center shift track button is engaged, and wherein the new implement GPS lateral offset is added to the implement profile to form a new implement profile.

12. The work machine of claim 11, wherein the instructions are executable by the processor to determine a guidance width for the agricultural implement.

13. The work machine of claim 1, wherein the instructions are executable by the processor to execute a new heading at 90 degrees relative to a vehicle axis for the work machine while the work machine is in a parked configuration and the automatic implement guidance control is disengaged.

14. The work machine of claim 13, wherein the instructions are executable by the processor to engage the automatic implement guidance control device to engage the agricultural GPS receiver to track the agricultural implement as the agricultural implement passes over the ground surface and the work machine drives along a 0 degree track relative to the vehicle axis of the work machine, wherein when a center shift track button is engaged the instructions are executable by the processor to determine a shifted value of the agricultural implement.

15. The work machine of claim 14, wherein the instructions are executable by the processor to determine a shifted implement receiver inline offset of the work vehicle.

16. The work machine of claim 15, wherein when the work vehicle is an articulated type of vehicle, the instructions are executable by the processor to determine the shifted implement receiver inline offset as the shifted value less (i) a distance from the front axle to an articulation joint of the work vehicle, less (ii) a distance from the rear axle to the articulation joint, less (iii) a connection offset, plus (iv) a work vehicle GPS inline offset.

17. The work machine of claim 16, wherein the work vehicle GPS inline offset is the inline distance from the center of the work vehicle GPS receiver to the rear axle of the work vehicle.

18. The work machine of claim 16, wherein the instructions are executable by the processor to determine a new implement profile that includes the shifted implement receiver inline offset.

19. The work machine of claim 15, wherein when the work vehicle is not an articulated type of vehicle, the instructions are executable by the processor to determine the shifted implement receiver inline offset as the shifted value less a work vehicle GPS inline offset less a connection offset.

\* \* \* \* \*